(12) United States Patent  
Qin et al.

(10) Patent No.: US 7,923,863 B2  
(45) Date of Patent: Apr. 12, 2011

(54) SYSTEM FOR LINE POWERING

(75) Inventors: Zhen Qin, Guangdong Province (CN); Xuefeng Pan, Guangdong Province (CN); Tianli Jiang, Guangdong Province (CN); Yingjie Zhou, Guangdong Province (CN); Xianyin Li, Longgang Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 408 days.

(21) Appl. No.: 11/771,228

(22) Filed: Jun. 29, 2007

(65) Prior Publication Data

US 2008/0122586 A1 May 29, 2008

Related U.S. Application Data

(63) Continuation of application No. PCT/CN2006/000708, filed on Apr. 18, 2006.

(30) Foreign Application Priority Data

Apr. 30, 2005 (CN) .......................... 2005 1 0067987

(51) Int. Cl.  
*H02J 9/00* (2006.01)
(52) U.S. Cl. ....................................................... 307/64
(58) Field of Classification Search ...................... 307/64  
See application file for complete search history.

(56) References Cited

U.S. PATENT DOCUMENTS

| | | | |
|---|---|---|---|
| 5,946,617 | A | 8/1999 | Portaro et al. |
| 6,459,171 | B1 | 10/2002 | Leifer |
| 6,690,718 | B1 | 2/2004 | Kim |
| 2003/0048004 | A1* | 3/2003 | Fleming et al. ................. 307/64 |

FOREIGN PATENT DOCUMENTS

| | | |
|---|---|---|
| CN | 1285680 | 2/2001 |
| CN | 1481110 | 3/2004 |
| WO | 98/08288 | 2/1998 |
| WO | 2005/036815 | 4/2005 |
| WO | 2005/046198 | 5/2005 |

OTHER PUBLICATIONS

English Translation of Written Opinion of the International Searching Authority for PCT Application No. PCT/CN2006/000708, mailed Jul. 13, 2006, 3 pgs.

* cited by examiner

*Primary Examiner* — Jared J Fureman  
*Assistant Examiner* — Dru M Parries  
(74) *Attorney, Agent, or Firm* — Finnegan, Henderson, Farabow, Garrett & Dunner LLP

(57) ABSTRACT

A system for line powering includes at least one office-end PSU, one standby PSU and one power switching unit. The office-end PSU provides power for a group of subscriber lines in a centralized manner. The power switching unit monitors the power supply status of the office-end PSU and controls the switching between the office-end PSU and standby PSU. In embodiments of the invention, different rectifier/boost circuits and different step-down circuits need not be set for each pair of subscriber lines between the office-end PSU and the remote device. When an office-end PSU fails to supply power, the standby PSU can be switched over quickly to supply power for the remote device, which cuts down the cost for designing the office-end PSU and the standby PSU while ensuring the reliability of power supply for the remote device.

6 Claims, 2 Drawing Sheets

SYSTEM FOR LINE POWERING

CROSS-REFERENCE TO RELATED APPLICATIONS

This application is a continuation application of PCT application No. PCT/CN2006/000708, filed Apr. 18, 2006, which claims a priority of Chinese application No. 200510067987.X.

FIELD OF THE INVENTION

The present invention relates to a system for line powering in the field of communications, in particular, to a system for line powering in a communication system.

BACKGROUND OF THE INVENTION

To address a continuous increase of communication service requirements, a common practice adopted by operators to deliver new services to subscribers, or to upgrade a prior network and improve subscribers combination, based on a already laid subscriber line network, is: to move broadband or narrowband devices nearer to a subscriber side, and utilize subscriber lines, such as twisted pairs or coaxial cables, as the uplink channel. This practice allows more subscribers and more services at the subscriber side.

When more broadband and narrowband devices are moved to the subscriber side, a supply of power for remote devices becomes a problem uneasy to be solved, because, at the subscriber side, the environment is complex, and it is inconvenient to supply power in most situations.

A method of line powering, in which an office end provides power for remote devices via subscriber lines, has grown into a major technical solution for operators to acquire subscribers and expand services. After adoption of a line powering technology, a power supply for remote devices is largely enhanced in reliability and maintainability. The technology is applied to more and more network products.

FIG. 1 illustrates an operating principle of a system for line powering in related arts.

As shown in FIG. 1, a power provided by an office-end Power Supply Unit (PSU) may be directly transmitted over subscriber lines or coupled to and transmitted over subscriber lines to a remote device. When the power is directly transmitted over subscriber lines, the remote device receives the power directly. When the power is coupled to and transmitted over subscriber lines, a decoupling unit is needed at the remote device to decouple signal and power.

To enhance the reliability of line powering, power supply redundancy is usually used. FIG. 2 shows a principle of implementing a system for line powering in related arts with power supply redundancy.

In FIG. 2, the office-end PSU is usually in the form of a separate device or a module in a device. Each pair of subscriber lines connected to the office-end PSU has a rectifier/boost circuit to enable the boost of power. A boosted power takes up some pairs of subscriber lines directly and is transmitted over the subscriber lines in a separate manner. Likewise, in the remote device, a step-down circuit is set corresponding to each of the pairs of subscriber lines to reduce the power voltage. The power, with voltage reduced, is combined inside the PSU at a remote end.

In the related system, the office-end PSU provides separate power to each pair of subscriber lines. Every pair of subscriber lines backs up one another. This system, therefore, can be called a line powering system with subscriber line backup.

The transformers, diodes and Metal-Oxide-Semiconductor Field-Effect Transistors (MOSFETs) shown in FIG. 2 and the circuits they form are for illustration of regulating voltage circuits, such as the boost circuits or step-down circuits. They do not represent the specific structure and circuit features inside the office-end PSU and the remote device.

In the related system with subscriber line backup, the office-end PSU provides separate power to each pair of subscriber lines. A rectifier/boost circuit is set inside the office-end PSU and a step-down circuit is set inside the remote device for each of the pairs of subscriber lines. This increases the cost of the line powering system. When more remote devices are added, this cost will be even higher.

SUMMARY OF THE INVENTION

Embodiments of the present invention disclose a system for line powering that includes a remote device and an office-end PSU. The office-end PSU provides power for the remote device via a group of subscriber lines. The office-end PSU provides power to a corresponding group of subscriber lines in a centralized manner. In addition, the line powering system includes a standby PSU and a power switching unit. The power switching unit connects respectively to the office-end PSU, the standby PSU and the remote device. The power switching unit monitors power supply status of the office-end PSU and controls a switching between the standby PSU and the office-end PSU.

The group of remote devices includes at least one remote device. The group of office-end PSUs includes at lease one office-end PSU.

One or more standby PSUs may be configured as needed.

The standby PSU provides power for remote devices connected to an office-end PSU that is exceptional in supplying power.

The office-end PSU and standby PSU are pluggable PSUs.

The power switching unit includes a monitoring unit, a control circuit and switches.

The number of switches matches the number of office-end PSUs and the number of standby PSUs.

The monitoring unit monitors the power supply status of the office-end PSU. It sends messages indicating exceptional power supply to the control circuit to trigger the control circuit and the switch to switch from the faulty office-end PSU to the standby PSU so that the standby PSU is connected with the remote device previously connected to the faulty office-end PSU.

The switches may be relays, transistors or MOS tubes.

The power switching unit is equipped with coupling units and signal control switches and the remote device is equipped with decoupling units.

The number of signal control switches and the number of coupling units match the number of office-end PSUs and the number of standby PSUs.

One office-end PSU matches one signal control switch and one coupling unit.

When a signal control switch is closed, the related coupling unit couples the signal and the power provided by the related office-end PSU and transmits the signal and power to the decoupling unit of the remote device via a group of subscriber lines.

The control circuit triggers the signal control switch to switch from the faulty office-end PSU to the standby PSU, re-couples the signal and power, and transmits the signal and power to the decoupling unit of the remote device to realize the supply of power.

The above description clarifies that the office-end PSU of this invention provides power for multiple subscriber lines in a centralized manner and thus avoids setting different rectifier/boost circuits and different step-down circuits for different pairs of subscriber lines. The cost for designing the office-end PSU and remote device is also cut down as a result. The configuration of standby PSU and power switching unit ensures power supply for remote devices from the standby PSU when the office-end PSU is faulty. Reliability is guaranteed in supplying power for remote devices. The configuration of standby power switching unit further enhances the reliability of the line powering system this invention discloses. The technical solution of this invention, therefore, realizes the objective to cut down the cost and ensure the reliability of the line powering system.

DETAILED DESCRIPTION OF THE INVENTION

In the following detailed description of preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Embodiments of the invention use an office-end PSU to provide power for a corresponding group of subscriber lines in a centralized manner. The line powering system includes a standby PSU and a power switching unit that connects respectively to the office-end PSU, the standby PSU and a remote device. The power switching unit monitors a power supply status of the office-end PSU, and also controls connecting the standby PSU with the remote device connected to the faulty office-end PSU.

The following gives a detailed description of the invention based on the above philosophy in conjunction with the accompanying drawings.

Figure 1:
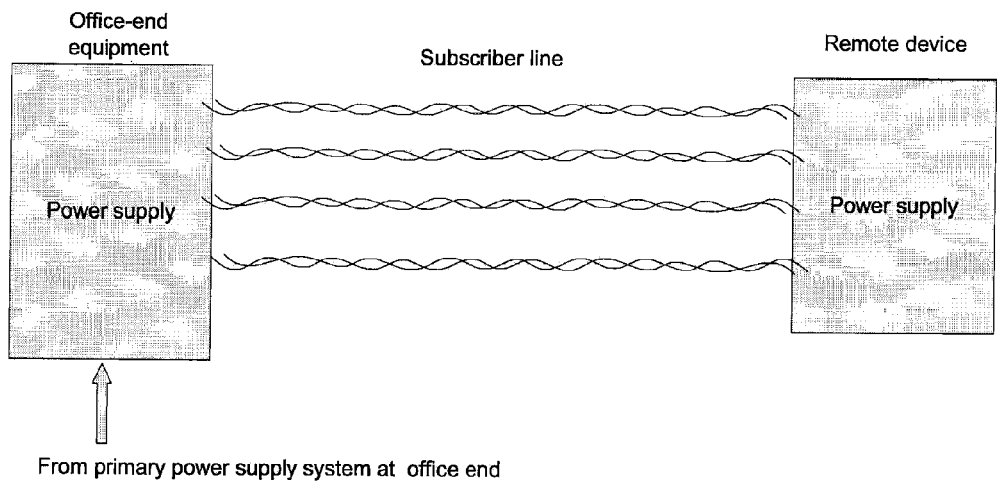
FIG. 1 is a schematic diagram showing an operating principle of a line powering system.
Figure 2:
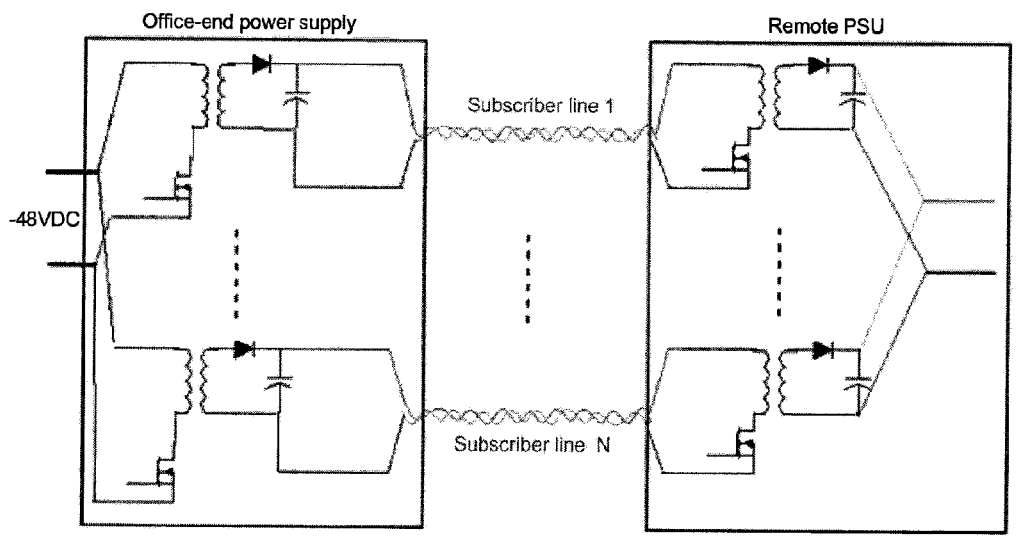
FIG. 2 illustrates a line powering system using subscriber line backup in related arts.
Figure 3:
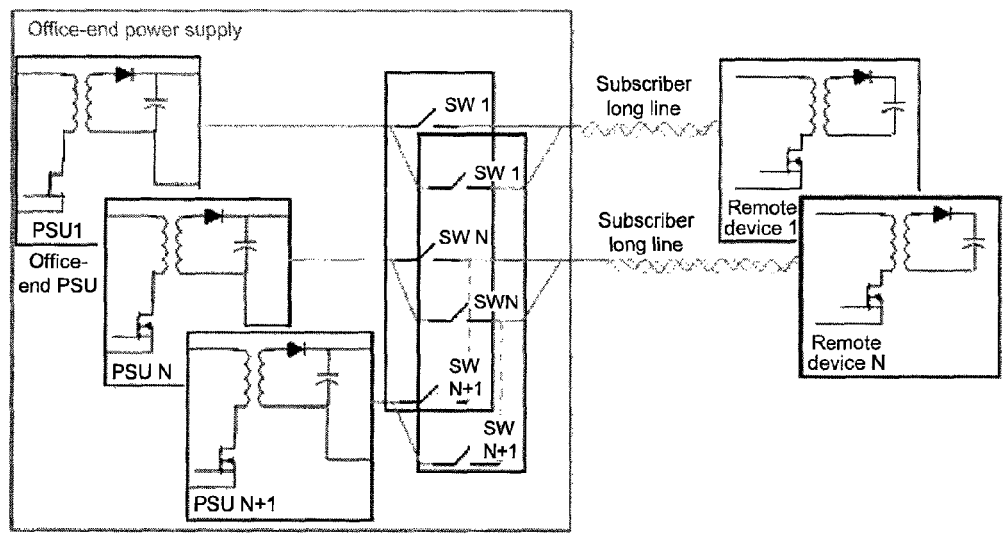
FIG. 3 illustrates a line powering system according to an embodiment of the invention.

FIG. 3 depicts a line powering system according to an embodiment of the invention.

As shown in FIG. 3, the line powering system according to an embodiment of the invention includes: N+1 office-end PSUs represented by PSUi (i=1, 2, . . . , N+1), N remote devices, a power switching unit and a standby power switching unit. One of the N+1 office-end PSUs may be set as a standby PSU. Any one of the N+1 office-end PSUs may be set as a standby PSU based on actual needs.

In this embodiment of the invention, the office-end PSUs do not provide separate power for each pair of subscriber lines. Instead, it supplies power for multiple pairs of subscriber lines in a centralized manner. In other words, at an office-end PSU, a rectifier/boost circuit is set for the pairs of subscriber lines in a centralized manner, one rectifier/boost circuit matching several pairs of subscriber lines. Thereby, at a remote device, only one step-down circuit needs to be set for these pairs of subscriber lines. The cost for designing the office-end PSU and the remote device is thus reduced.

The pairs of subscriber lines connected with one office-end PSU include at least two pairs of subscriber lines.

The power switching unit includes a monitoring unit, a control circuit and N+1 switches represented by SWi (i=1, 2, . . . , N+1). The N+1 switches SWi correspond to N office-end PSUs and one standby PSU. For instance, the switch SW1 corresponds to the office-end PSU1, the switch SW2 corresponds to the office-end PSU2, . . . , the switch SWN corresponds to the office-end PSU N, and the switch SWN+1 corresponds to the office-end PSU N+1.

When a switch is closed, the office-end PSU that corresponds to this switch connects to the corresponding remote device to supply power to this remote device via several pairs of subscriber lines.

The switches may be relays, transistors or MOS tubes.

In normal situations, the office-end PSU1 provides power for the remote device 1 via several pairs of subscriber lines when the switch SW1 is closed; likewise, the office-end PSU2, . . . , and the office-end PSU N provide power respectively for the remote device 2, . . . and the remote device N. Although one PSU provides power for one remote device via pairs of subscriber lines, it may provide power over several pairs of subscriber lines in a centralized manner through a rectifier/boost circuit, as shown in FIG. 3. This is a big difference from related arts, in which an office-end PSU provides separate power for each pair of subscriber lines. The standby PSU N+1 stands by to provide power. SWN+1 is open.

Assume that the office-end PSU N becomes faulty. The monitoring unit detects the exception of the office-end PSU N and sends an exception message to the control circuit. The control circuit sets the switch SWN to open and closes the switch SWN+1 so that the standby office-end PSU N+1 is connected with the pairs is of subscriber lines corresponding to the office-end PSU N. Then the office-end PSU N+1 takes over the task of the office-end PSU N to supply power for the remote device N.

To ensure the reliability of power supply for remote devices, in this embodiment of the invention, multiple, like 2 or 3, standby office-end PSUs may be set to guarantee timely switching in case several office-end PSUs fail at the same time.

In the N+1 redundancy mode, one standby office-end PSU is configured to back up N office-end PSUs. When, at any time, one of the N office-end PSUs fails, only one standby PSU is available to take over tasks of the faulty PSU. The N+1 redundancy mode is adopted in this embodiment of the invention for office-end PSUs. As one office-end PSU provides power for one remote device, the whole system in this embodiment of the invention is a line powering system using N+1 redundancy.

In this embodiment of the invention, the line powering system using N+1 redundancy is adopted. Compared with the line powering system using subscriber line backup in related arts, the N+1 redundancy system features high reliability in supplying power for remote devices. If a load power of a remote device is high, this embodiment of the invention only needs an addition of more subscriber lines, for which, the corresponding office-end PSU provides power in a centralized manner. Thereby, the cost of the line powering system is cut down while the reliability of power supply is ensured.

To further enhance the reliability of power supply for remote devices, in one embodiment of the invention, two power switching units may be configured to form 1+1 backup. The two power switching units may work in the active/standby mode or fully synchronous mode, or any other mode.

In one embodiment of the invention, the office-end PSU may be designed to a pluggable unit. The standby PSU may also be designed to a pluggable unit. This facilitates the configuration and maintenance of office-end PSUs and standby PSU.

As shown in FIG. 3, the office-end PSU provides power for the remote device over subscriber lines directly. This means the subscriber lines are used as special power cables. If coupling is adopted for the office-end PSU to provide power for the remote device via subscriber lines, coupling units need be added to the line powering system as shown in FIG. 4, another embodiment of the invention.

Figure 4:
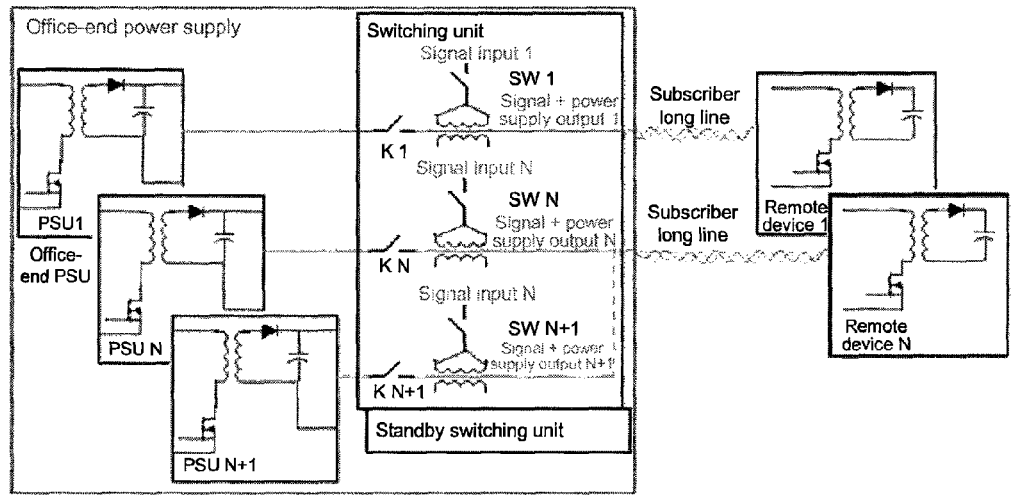
FIG. 4 illustrates a line powering system according to another embodiment of the invention.

In FIG. 4, a line powering system includes: N office-end PSUs, N remote devices, one standby PSU, one power switching unit and one standby power switching unit.

The power switching unit includes: a monitoring unit, a control circuit, N+1 switches represented by SWi (i=1, 2, ..., N+1), N+1 coupling units and N+1 signal control switches represented by Ki (i=1, 2, ..., N+1).

A decoupling unit is configured in each remote device.

In normal situations, coupling unit 1 couples the power supplied by the office-end PSU1 to several pairs of subscriber lines when the switch SW1 and the signal control switch K1 are closed, and the decoupling unit of remote device 1 decouples the power and provides the power for the remote device 1. Likewise, the office-end PSU2, ..., and the office-end PSU N provide power respectively to the remote device 2, ... and the remote device N. The standby office-end PSU N+1 stands by to supply power. The switch SWN+1 and the signal control switch KN+1 are open.

Assume that the office-end PSU N becomes faulty. The monitoring unit detects an exception of the office-end PSU N and sends a exception message to the control circuit. The control circuit sets the switch SWN and the signal control switch KN to open and closes the switch SWN+1 and the signal control switch KN+1 so that the standby office-end PSU N+1 is connected with the pairs of subscriber lines corresponding to office-end PSU N. Coupling unit N+1 couples the power supplied by the office-end PSU N+1 with the signal of the faulty office-end PSU N, and sends the power and the signal to the decoupling unit of the remote device N via subscriber lines corresponding to the office-end PSU N. Then the office-end PSU N+1 takes over the task of the office-end PSU N to provide power for remote device N.

The line powering system with the addition of coupling and decupling units achieves the redundancy of power supply in a way similar to description of FIG. 3. The difference is the addition of the control over signal control switches by the control circuit and the coupling and decoupling of signal and power. In this embodiment of the invention, the mode for the coupling unit to couple signal and power is not restricted.

Although the present invention has been described through several embodiments, a myriad of changes, variations, alterations, transformations, and modifications may be suggested to one skilled in the field, and it is intended that the present invention comprise such changes, variations, alterations, transformations, and modifications as fall within the scope of the appended claims.

The invention claimed is:

1. A system for line powering used for providing power for at least one remote device, the system for line powering comprising:
   office-end Power Supply Units (PSUs), configured to supply power in a centralized manner to the at least one remote device via a group of subscriber lines, wherein each of the office-end PSUs is capable of being set as a standby PSU for other office-end PSUs when any one of the other office-end PSUs becomes faulty;
   a power switching unit, connected to the office-end PSUs and the at least one remote device, the power switching unit comprising:
   a monitoring unit;
   a control circuit;
   switches, each of which corresponding to one of the office-end PSUs;
   coupling units; and
   signal control switches, each of which corresponding to one of the coupling units,
   wherein the monitoring unit is configured to monitor a power supply status of the office-end PSUs, send messages indicating exceptional power supply to the control circuit, and trigger the control circuit when any one of the office-end PSUs becomes faulty,
   wherein the control circuit is configured to turn off the switch corresponding to the faulty office-end PSU, and turn on the switch corresponding to the standby PSU, so that the standby PSU is connected with the group of subscriber lines corresponding to the faulty office-end PSU,
   wherein one of the coupling units is configured to couple a signal to the power, and transmit the signal and the power to the at least one remote device via the group of subscriber lines when the signal control switch corresponding to the one of the coupling units is turned on.

2. The system of claim 1, wherein the office-end PSUs are pluggable PSUs.

3. The system of claim 1, wherein the number of the switches matches the number of the office-end PSUs.

4. The system of claim 1, wherein the switches are relays, transistors, or metal-oxide-semiconductor field-effect transistors.

5. The system of claim 1, wherein the number of the signal control switches matches the number of the office-end PSUs, and each of the office-end PSUs corresponds to one of the signal control switches and one of the coupling units.

6. The system of claim 5, wherein:
   the control circuit triggers a corresponding signal control switch to switch from one of the office-end PSUs and a corresponding coupling unit to the standby PSU,
   the corresponding coupling unit re-couples the signal and the power, and
   the corresponding coupling unit is configured to transmit the signal and the power to a decoupling unit of the remote device.

* * * * *